(12) United States Patent
Kubota

(10) Patent No.: US 6,426,375 B1
(45) Date of Patent: Jul. 30, 2002

(54) METHOD FOR INK JET RECORDING ON NON-ABSORBING RECORDING MEDIUM

(75) Inventor: Kazuhide Kubota, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/541,934

(22) Filed: Apr. 3, 2000

(30) Foreign Application Priority Data

| Apr. 1, 1999 | (JP) | 11-095233 |
| May 20, 1999 | (JP) | 11-140784 |
| Mar. 31, 2000 | (JP) | 2000-097696 |

(51) Int. Cl.⁷ ............... C09D 11/10; C08L 33/02; C08F 220/06; C08F 269/00; B41J 3/407

(52) U.S. Cl. .............. 523/160; 523/201; 524/556; 347/106

(58) Field of Search ............... 523/160, 161, 523/201; 347/100, 101, 106; 106/31.6, 31.65; 524/424, 429, 556

(56) References Cited

U.S. PATENT DOCUMENTS

| 4,948,772 A | * | 8/1990 | Hoshino et al. ............. 503/207 |
| 5,518,534 A | * | 5/1996 | Pearlstine et al. ....... 106/31.75 |
| 5,624,484 A | * | 4/1997 | Takahashi et al. ....... 106/31.75 |
| 5,734,403 A | | 3/1998 | Suga et al. ................. 347/101 |
| 5,849,815 A | * | 12/1998 | Aoki et al. .................. 523/161 |
| 6,027,210 A | * | 2/2000 | Kurabayashi et al. ....... 347/100 |

FOREIGN PATENT DOCUMENTS

| EP | 0 534 634 | | 3/1993 |
| EP | 739743 | * | 10/1996 |
| EP | 0796901 | | 9/1997 |
| EP | 832741 | * | 4/1998 |
| EP | 0867484 | | 9/1998 |
| JP | 03(1991)-240557 | | 10/1991 |
| JP | 03(1991)-240558 | | 10/1991 |
| JP | 09(1997)-286944 | | 11/1997 |
| JP | 11034478 | * | 2/1999 |

OTHER PUBLICATIONS

JPO Abstract 03(1991)–240557, Oct. 25, 1991.

JPO Abstract 03(1991)–240558, Oct. 25, 1991.

JPO Abstract 09(1997)–286944, Nov. 4, 1997.

* cited by examiner

*Primary Examiner*—Vasu Jagannathan
*Assistant Examiner*—Callie E. Shosho
(74) *Attorney, Agent, or Firm*—Ladas & Parry

(57) ABSTRACT

An ink jet recording method using two liquids is provided which can realize good images on ink composition-non-absorbing recording media. An ink composition and a reaction solution are deposited onto a recording medium which does not substantially absorb the ink composition, thereby performing printing. The ink composition comprises a pigment and resin emulsion having a minimum film-forming temperature of 20° C. or below. The content of the polymer particulates in the ink composition is not less than 5% by weight. The weight ratio of the polymer particulates to the pigment is 1 to 20. The reaction solution contains a polyvalent metal salt. Utilization of both the ink composition and the reaction solution can realize good images on non-absorbing recording media.

19 Claims, 4 Drawing Sheets

METHOD FOR INK JET RECORDING ON NON-ABSORBING RECORDING MEDIUM

BACKGROUND OF THE INVENTION

1. Field of the Invention

The present invention relates to an ink jet recording method, and more particularly to an ink jet recording method wherein a reaction solution and an ink composition are deposited on a recording medium having no ink composition absorbing capacity to perform printing.

2. Background Art

Ink jet recording is a printing method wherein droplets of an ink composition are ejected and deposited onto a recording medium to perform printing. This method has a feature that images having high resolution and high quality can be printed at a high speed by means of relatively inexpensive apparatuses. In general, the ink composition used in the ink jet recording comprises water as a main component and, added thereto, a colorant and a wetting agent, such as glycerin, for preventing clogging and other purposes.

Recording media, such as papers, absorb the ink composition to permit the colorant to penetrate into and to be fixed onto the recording media.

On the other hand, plastic films, such as OHP sheets, do not inherently absorb the ink composition. Thus, for ink jet recording on the recording medium having no ink composition absorbing capacity, the ink composition should be strongly fixed onto the surface of the recording medium. The ink composition that is not strongly fixed forms images having poor rubbing/scratch resistance. Further, when an ink composition composed mainly of water is used, the time required for the formed image to be fixed onto the recording medium, that is, the drying time, is preferably short. This is because the long drying time may cause a fear that the image is deteriorated upon contact of the image with members within a printer or upon contact of the image with a hand or the like after a discharge from the printer. Further, in the case of printing on recording media having no ink composition absorbing capacity, a solvent added to the ink composition should be selected so that the recording medium neither undergoes a change in quality nor is deformed by the solvent contained in the ink composition.

On the other hand, regarding the ink jet recording method, the application of a polyvalent metal salt solution onto a recording medium followed by the application of an ink composition containing a dye having at least one carboxyl group has been recently proposed (for example, Japanese Patent Laid-Open No. 202328/1993). The claimed advantage of this method is that the polyvalent metal ion combines with the dye to form an insoluble complex, the presence of which can offer an image having water fastness and high quality free from color bleeding.

Further, the use of a color ink comprising at least a surfactant for imparting a penetrating property or a solvent having a penetrating property and a salt in combination with a black ink capable of being thickened or agglomerated through the action of the salt has been proposed in the art (Japanese Patent Laid-Open No. 106735/1994). The claimed advantage of this method is that high-quality color images having high image density and free from color bleeding can be yielded. Specifically, an ink jet recording method has been proposed wherein two liquids, a first liquid containing a salt and a second liquid of an ink composition, are printed to realize good images.

Other ink jet recording methods, wherein two liquids are printed, have also been proposed, for example, in Japanese Patent Laid-Open Nos. 240557/1991 and 240558/1991.

SUMMARY OF THE INVENTION

The present inventors have now found an ink jet recording method, using two liquids, which can realize good images on recording media having no ink composition absorbing capacity. The present invention has been made based on such finding.

Accordingly, it is an object of the present invention to provide an ink jet recording method, using two liquids, which can realize good images on recording media having no ink composition absorbing capacity.

According to one aspect of the present invention, there is provided an ink jet recording method comprising the steps of: depositing a reaction solution and an ink composition onto a recording medium to perform printing, wherein the recording medium does not substantially absorb the ink composition;

the reaction solution comprises a reactant which, when brought into contact with the ink composition, produces coagulate; and the ink composition comprises a pigment and resin emulsion having a minimum film-forming temperature of 20° C. or below, the content of the polymer particulates in the ink composition being not less than 5% by weight, the weight ratio of the polymer particulates to the pigment being 1 to 20.

Description of the Preferred Embodiments

Ink Jet Recording Method

Figure 1:
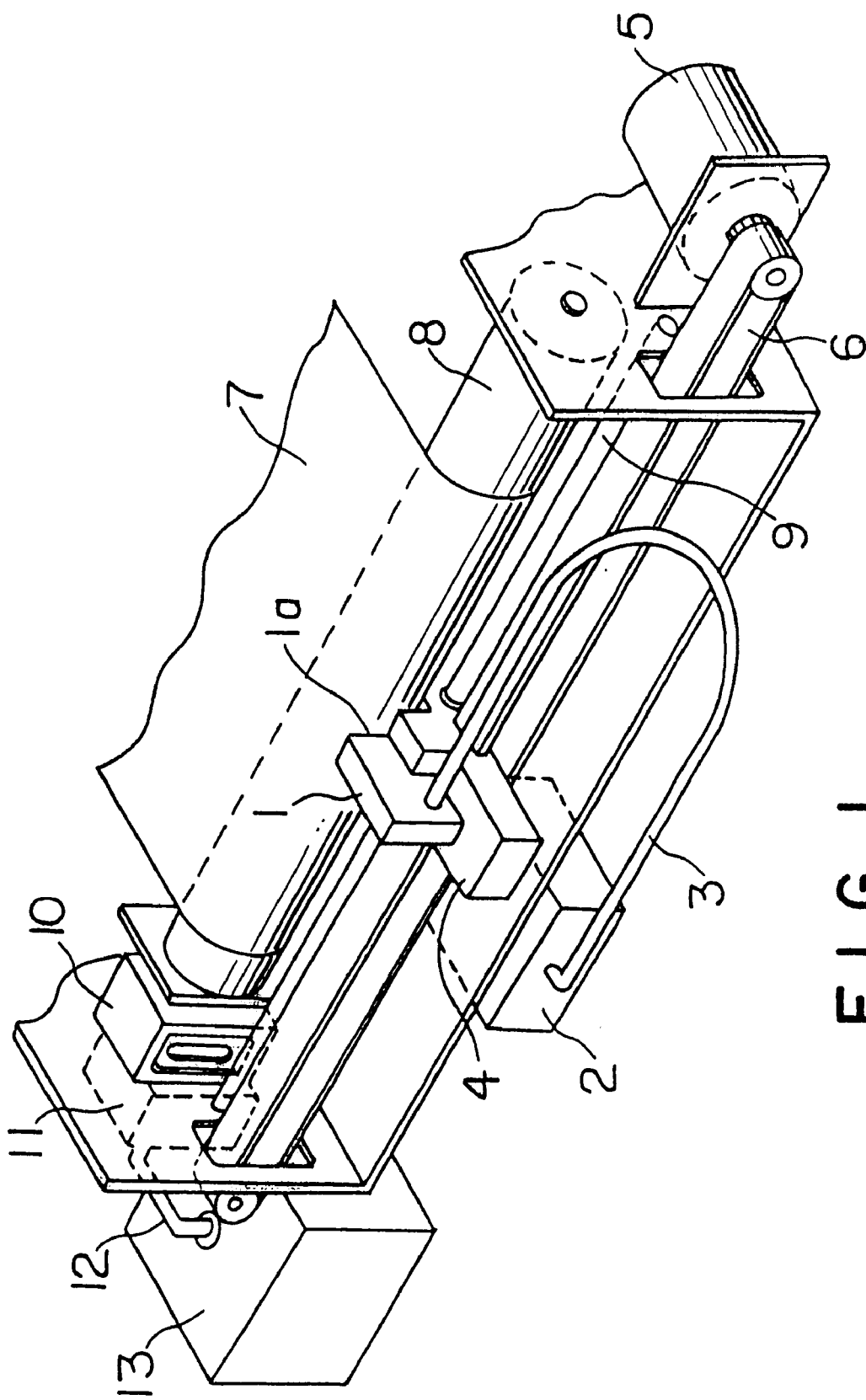
FIG. 1 is a diagram showing an ink jet recording apparatus according to the present invention, wherein a recording head is provided separately from an ink tank to feed an ink composition and a reaction solution into a recording head through an ink tube.

The ink jet recording method according to the present invention comprises the step of printing an ink composition and a reaction solution described below onto a recording medium having substantially no ink composition absorbing capacity.

The recording medium according to the present invention does not substantially absorb an ink composition. The "having substantially no ink composition absorbing capacity" or "does not substantially absorb an ink composition" refers to a recording medium such that an ink composition does not penetrate the recording medium at all within several sec after the deposition of the ink composition onto the recording medium. Specific examples of recording media, to which the ink jet recording method according to the present invention is applicable, include: plastic sheets using, as a base material, polyethylene terephthalate, polycarbonate, polypropylene, polyethylene, polysulfone, ABS resin, and polyvinyl chloride; recording media prepared by coating a metal, for example, by vapor deposition, onto the surface of metals, such as brass, iron, aluminum, SUS, and copper, or non-metallic substrates; recording media prepared by subjecting paper as a substrate, for example, to water repellency-imparting treatment; recording media prepared by subjecting the surface of fibers, such as cloth, for example, to water repellency-imparting treatment; and recording media formed of the so-called "ceramic materials," prepared by firing inorganic materials at a high temperature.

In the ink jet recording method according to the present invention, the contact of the reaction solution with the ink composition can realize good prints. Although the present invention is not intended to be bound by the following hypothesis, the reason why good printing can be achieved by the contact of the reaction solution with the ink composition is believed as follows. Upon contact of the reaction solution with the ink composition, the reactant contained in the reaction solution breaks the state of dispersion of a colorant, fine particles of the polymer, and other ingredients contained in the ink composition, resulting in coagulation of these ingredients. The resultant coagulate is considered to strongly fix the colorant onto the surface of the recording medium. Further, according to the present invention, the ink composition contains resin emulsion having specific properties. It is expected that the presence of the resin emulsion accelerates the formation of the coagulate. As a result, images having high color density and no significant feathering and uneven printing could be realized. Further, in the case of color images, uneven color mixing in boundaries of different colors, that is, color bleeding, can also be advantageously prevented. The above mechanism is merely hypothetical, and should not be construed as limiting the present invention.

The reaction solution and the ink composition may be applied onto the recording medium in any order. Specifically, suitable methods for the deposition of the reaction solution and the ink composition include a method wherein the ink composition is deposited onto the recording medium after the deposition of the reaction solution onto the recording medium, a method wherein the ink composition is first printed onto the recording medium followed by the deposition of the reaction solution onto the recording medium, and a method wherein the reaction solution and the ink composition are mixed together just before or just after the ejection.

The deposition of the reaction solution onto the recording medium may be carried out by any of a method wherein the reaction solution is selectively deposited onto only an area where the ink composition is deposited, and a method wherein the reaction solution is deposited on the whole area of the recording medium. The former method is cost-effective because the consumption of the reaction solution can be minimized. In this method, however, the accuracy of the position at which both the reaction solution and the ink composition are deposited should be high to some extent. On the other hand, in the latter method, as compared with the former method, the requirement for the accuracy of the position where the reaction solution and the ink composition are deposited is relaxed. In the latter method, however, a larger amount of the reaction solution should be deposited on the whole area of the recording medium. This is often disadvantageous from the viewpoint of drying properties. For this reason, the method to be used may be determined by taking a combination of the ink composition with the reaction solution into consideration. When the former method is adopted, the reaction solution may be deposited by ink jet recording.

Ink composition

According to the present invention, the ink composition refers to a black ink composition in the case of monochrome printing and color ink compositions in the case of color printing, specifically yellow, magenta, and cyan ink compositions, and optionally a black ink composition.

The ink composition used in the method according to the present invention comprises at least a pigment and resin emulsion.

The resin emulsion has the effect of accelerating the fixation of the pigment onto the surface of the recording medium through interaction between the resin emulsion and the reactant in the reaction solution, particularly a polyvalent metal ion, a polyallylamine, or a polyallylamine derivative. Further, some resin emulsions have the effect of forming a film on the recording medium to improve the rubbing/scratch resistance of prints.

The ink composition according to the present invention preferably contains a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, acryl/styrene resin, butadiene resin, styrene resin, crosslinked acrylic resin, crosslinked styrene resin, benzoguanamine resin, phenolic resin, silicone resin, and epoxy resin. Also, according to the present invention, "resin components particle comprising of resin emulsion" refer to "polymer particulates" or "resin emulsion particles".

According to the present invention, the resin emulsion has a minimum film-forming temperature of 20° C. or below. In this case, the term "minimum film-forming temperature" used herein refers to a minimum temperature at which, when a resin emulsion prepared by dispersing polymer particulates in water is thinly cast onto a sheet of a metal, such as aluminum, to form a coating which is then gradually heated, a transparent, continuous film is formed. In this case, a white powder is formed in a temperature region below the minimum film-forming temperature. Further, according to a preferred embodiment of the present invention, the fine particles of the polymer have a glass transition point of 10° C. or below.

The ink composition used in the present invention contains the polymer particulates in an amount of not less than 5% by weight, more preferably not less than 8% by weight, based on the ink composition. The weight ratio of the polymer particulates to the pigment is in the range of 1 to 20, preferably in the range of 2 to 10.

The diameter of the polymer particulates is preferably not more than about 100 nm, more preferably about 5 to 80 nm.

According to a preferred embodiment of the present invention, the polymer particulates have carboxyl groups on the surface thereof and, in addition, have high reactivity with a divalent metal salt. More specifically, the polymer particulates have a reactivity with a divalent metal salt such that, when 3 volumes of a 0.1 wt % aqueous emulsion is brought into contact with one volume of a 1 mol/liter aqueous divalent metal salt solution, the time required for the transmission of light having a wavelength of 700 nm to become 50% of the initial value is not more than $1 \times 10^4$ sec (preferably not more than $1 \times 10^3$ sec, more preferably not more than $1 \times 10^2$ sec). The resin emulsion, when brought into contact with divalent metal ions, are reacted with the divalent metal ions to form suspended matter which lowers the transparency of the solution. The amount of the resultant suspended matter is measured in terms of light transmission. Specific examples of divalent metal ions include divalent metal ions, such as $Ca^{2+}$, $Cu^{2+}$, $Ni^{2+}$, $Mg^{2+}$, $Zn^{2+}$, and $Ba^{2+}$. Anions, which form salts with divalent metal ions, include $Cl^-$, $NO_3^-$, $I^-$, $Br^-$, $ClO_3^-$, and $CH_3COO^-$. This high reactivity is considered attributable to the presence of a relatively large amount of carboxyl groups on the surface of the polymer particulates. Ink compositions containing polymer particulates having, on the surface thereof, a large amount of carboxyl groups having high reactivity do not have any affinity for a nozzle plate, in a head for ink jet recording, which has been subjected to water repellency-imparting treatment. This can provide a great advantage that problems involved in conventional a water-soluble resin-containing ink compositions, that is, an ink droplet trajectory directionality problem and a failure of the ink droplets to be ejected, caused by good wettability of the nozzle plate by the ink composition, can be effectively prevented. According to a preferred embodiment of the present invention, the contact angle of an aqueous emulsion, prepared by dispersing the polymer particulates in a water medium to provide a polymer particulate concentration of 10% by weight, on a teflon sheet is not less than 70 degrees. Further, the surface tension of an aqueous emulsion, prepared by dispersing the polymer particulates in a water medium to provide a polymer particulate concentration of 35% by weight is preferably not less than $40 \times 10^{-3}$ N/m (40 dyne/cm, 20° C.). The utilization of such resin emulsion can more effectively prevent the ink droplet trajectory directionality problem and, at the same time, can realize good prints.

Further, the polymer particulates having a relatively large amount of carboxyl groups can realize better rubbing/scratch resistance and water fastness. Although the reason for this has not been fully elucidated yet, the reason is believed to be as follows. Specifically, upon the deposition of the ink composition on the surface of a recording medium such as paper, water and a water-soluble organic solvent contained in the ink composition first penetrate into the recording medium, leaving the colorant and the polymer particulates around the surface of the recording medium. At that time, carboxyl groups on the surface of the polymer particulates are bonded to hydroxyl groups of cellulose constituting paper fibers. As a result, the polymer particulates are strongly; adsorbed onto the paper fibers. Further, this can suppress the penetration of the colorant into the paper. Water and the water-soluble organic solvent present around the polymer particulates adsorbed onto the paper fibers penetrate into the paper, and, consequently, the amounts of water and the water-soluble organic solvent are reduced. As described above, since the resin emulsion have a film-forming property, the reduction in the amounts of water and the water-soluble organic solvent permits polymer particulates to coalesce into a resin coating. This resin coating is more strongly fixed onto the surface of the recording medium by virtue of the presence of carboxyl groups. The above mechanism is merely hypothetical and should not be construed as limiting the present invention.

By virtue of the high affinity of the surface of the polymer particulates, the ink composition advantageously has excellent storage stability.

The resin emulsion may be prepared by emulsion polymerization of a resin monomer, optionally together with a surfactant, in water. For example, an emulsion of acrylic resin or styrene/acryl resin may be prepared by subjecting an ester of (meth)acrylic acid or alternatively an ester of (meth)acrylic acid in combination with styrene to emulsion polymerization in water in the presence of a surfactant. In general, the mixing ratio of the resin component to the surfactant is preferably about 1000:1 to 10:1. When the amount of the surfactant used is in the above range, the ink composition has better water fastness and penetrability. The surfactant is not particularly limited. Examples of preferred surfactants usable herein include anionic surfactants (for example, sodium dodecylbenzenesulfonate, sodium laurylate, and ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more. Further, acetylene glycol (OLFINE Y, Surfynol 82, Surfynol 104, Surfynol 440, Surfynol 465, and Surfynol 485 (all the above products being manufactured by Air Products and Chemicals Inc.) may also be used.

The ratio of the resin as the component constituting the dispersed phase to water is such that the amount of water is suitably 60 to 400 parts by weight, preferably 100 to 200 parts by weight, based on 100 parts by weight of the resin.

According to a preferred embodiment of the present invention, the resin is a polymer having a combination of a hydrophilic segment with a hydrophobic segment.

According to a preferred embodiment of the present invention, the ink composition contains a thermoplastic resin in the form of a resin emulsion. Further, preferably, the thermoplastic resin, when heated at the softening or melting temperature or a higher temperature and then cooled, forms a strong film having water fastness and rubbing/scratch resistance.

Specific examples of water-insoluble thermoplastic resins include, but are not limited to, polyacrylic acid, polymethacrylic acid, an ester of polymethacrylic acid, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a vinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples of low-molecular weight thermoplastic resins include polyethylene wax, montan wax, alcohol wax, synthetic oxide wax, an α-olefin/maleic anhydride copolymer, animal and plant waxes such as carnauba wax, lanolin, paraffin wax, and microcrystalline wax.

According to the present invention, conventional resin emulsions may also be used as the resin emulsion satisfying the above requirements. For example, resin emulsions described in Japanese Patent Publication No. 1426/1987 and Japanese Patent Laid-Open Nos. 56573/1991, 79678/1991, 160068/1991, and 18462/1992 may be used.

According to another preferred embodiment of the present invention, the polymer particulates contain 1 to 10% by weight of a structure derived from an unsaturated vinyl monomer having a carboxyl group and has a structure crosslinked by a crosslinkable monomer having two or more polymerizable double bonds with the content of the structure derived from the crosslinkable monomer being 0.2 to 4% by weight. The utilization of a three-dimensionally crosslinked polymer prepared by copolymerization of crosslinkable monomers having two or more polymerizable double bonds, preferably three or more polymerizable double bonds, makes it more difficult for the surface of the nozzle plate to be wetted by the ink composition. This can more effectively reduce the ink droplet trajectory directionality problem and, at the same time, can further improve the ejection stability.

According to the present invention, the polymer particulates may have a single-particle structure. On the other hand, according to the present invention, polymer particulates having a core/shell structure may also be utilized. The core/shell structure comprises a core and a shell surrounding the core. The term "core/shell structure" used herein refers to "a form such that two or more polymers having different compositions are present in a phase separated state in a particle." Forms of the core/shell structure usable in the present invention include a form wherein the core is entirely covered with the shell, a form wherein the core is partially covered with the shell, and a form wherein a part of the polymer constituting the shell forms a domain or the like within the core particle. Further, the particle may have a multi-layer. structure of three or more layers wherein at least one additional layer having a different composition is further interposed between the core and the shell.

According to a preferred embodiment of the present invention, the core is formed of a resin having epoxy groups, and the shell is formed of a resin having carboxyl groups. The epoxy group is reactive with the carboxyl group. These two groups are allowed to exist separately from each other. That is, the epoxy group is present in the core, while the carboxyl group is present in the shell. The reduction in the amount of water and the water-soluble organic solvent causes coalescence of the polymer particulates with one another, and the polymer particulates are deformed by pressure involved in the film formation. As a result, the epoxy groups in the core is bonded to the carboxyl groups in the shell to form a network structure. This can advantageously form a coating having higher strength. The amount of the unsaturated vinyl monomer having an epoxy group is preferably 1 to 10% by weight. According to the present invention, a reaction of a part of the epoxy groups with a part of the carboxyl groups before the film formation is acceptable so far as the film-forming property is not lost. In the present invention, the property such that, when reactive functional groups are allowed to coexist within the polymer particulates, these groups are reacted with each other without the addition of any curing agent at the time of film formation to form a network structure, will be referred to as "self-crosslinkable."

The resin emulsion used in the method according to the present invention may be prepared by conventional emulsion polymerization. Specifically, the resin emulsion may be prepared by emulsion polymerization of an unsaturated vinyl monomer in water in the presence of a polymerization catalyst and an emulsifier.

Unsaturated vinyl monomers usable herein include those commonly used in emulsion polymerization, such as acrylic ester monomers, methacrylic ester monomers, aromatic vinyl monomers, vinyl ester monomers, vinyl cyanide compound monomers, halogenated monomers, olefin monomers, and diene monomers. Specific examples thereof include: acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanide compounds, such as acrylonitrile and methacrylonitrile; halogenated monomers, such as vinylidene chloride and vinyl chloride; aromatic vinyl monomers, such as styrene, 2-methylstyrene, vinyltoluene, t-butylstyrene, chlorostyrene, vinylanisole, and vinylnaphthalene; olefins, such as ethylene, propylene, and isopropylene; dienes, such as butadiene and chloroprene; and vinyl monomers, such as vinyl ether, vinyl ketone, and vinylpyrrolidone. In the case of monomers not having a carboxyl group, an unsaturated vinyl monomer having a carboxyl group should be used. Preferred examples thereof include acrylic acid, methacrylic acid, itaconic acid, fumaric acid, and maleic acid. Among them, methacrylic acid is preferred. Emulsifiers usable herein include anionic surfactants, nonionic surfactants, and mixtures of these surfactants.

According to the present invention, a structure formed by crosslinking of molecules, derived from the above monomers, with a crosslinkable monomer having two or more polymerizable double bonds is preferred. Examples of crosslinkable monomers having two or more polymerizable double bonds include: diacrylate compounds, such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; methylene bisacrylamide; and divinylbenzene.

The addition of acrylamides or hydroxyl-containing monomers besides the above monomers can further improve printing stability. Examples of acrylamides include acrylamide and N,N'-dimethylacrylamide. Examples of hydroxyl-containing monomers include 2-hydroxyethyl acrylate, 2-hydroxypropyl acrylate, 2-hydroxyethyl methacrylate, and 2-hydroxypropyl methacrylate. They may be used alone or as a mixture of two or more.

The polymer particulates having a core/shell structure may be produced by conventional methods, generally multi-step emulsion polymerization and the like, for example, by a method disclosed in Japanese Patent Laid-Open No. 76004/1992. Examples of unsaturated vinyl monomers usable in the polymerization include those described above.

Methods usable for the introduction of epoxy group into the core include a method wherein an epoxy-containing unsaturated vinyl monomer, such as glycidyl acrylate, glycidyl methacrylate, or allylglycidyl ether, is copolymerized with other unsaturated vinyl monomer, and a method wherein, in the polymerization of at least one unsaturated vinyl monomer to prepare core particles, an epoxy compound is simultaneously added to form a composite structure. The former method is preferred from the viewpoints of easiness of the polymerization, polymerization stability and the like.

In the emulsion polymerization, initiators, surfactants, molecular weight regulators, neutralizing agents and the like may be used according to a conventional method.

According to the present invention, the resin emulsion may be mixed, in the form of a powder of fine particles, with other ingredients of the ink composition. A preferred method is such that the polymer particulates are dispersed in a water medium to form a polymer emulsion which is then mixed with other ingredients of the ink composition. The content of the polymer particulates in the ink composition is preferably about 5 to 40% by weight, more preferably about 8 to 20% by weight.

According to a preferred embodiment of the present invention, the ink composition contains an alginic acid derivative. Examples of preferred alginic acid derivatives include alkali metal alginates (for example, sodium salt and potassium salt), organic salts of alginic acid (for example, triethanolamine salt), and ammonium alginate.

The amount of the alginic acid derivative added to the ink composition is preferably about 0.01 to 1% by weight, more preferably about 0.05 to 0.5% by weight.

Although the reason why the addition of the alginic acid derivative can realize good images has not been fully elucidated yet, the reason is believed to reside in that the polyvalent metal salt present in the reaction solution reacts with the alginic acid derivative contained in the ink composition to change the state of dispersion of the colorant and consequently to accelerate the fixation of the colorant onto the recording medium.

The colorant contained in the ink composition used in the present invention is a pigment. Regarding the pigment, inorganic and organic pigments are usable. Examples of inorganic pigments usable herein include, in addition to titanium oxide and iron oxide, carbon blacks produced by known processes, such as contact, furnace, and thermal processes. Examples of organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added, to the ink, in the form of a pigment dispersion prepared by dispersing the pigment in an aqueous medium with the aid of a dispersant or a surfactant. Preferred dispersants usable herein include those commonly used in the preparation of a dispersion of a pigment, for example, polymeric dispersant. In this connection, it would be apparent to a person having ordinary skill in the art that the dispersant and the surfactant contained in the dispersion of the pigment function also as the dispersant and the surfactant for the ink composition.

The amount of the pigment added to the ink is preferably about 0.5 to 25% by weight, more preferably about 2 to 15% by weight.

According to a preferred embodiment of the present invention, the ink composition further contains an organic solvent. The organic solvent is preferably a low-boiling organic solvent. Preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the drying time of the ink.

According to a preferred embodiment of the present invention, the ink composition used in the present invention further contains a wetting agent comprising a high-boiling organic solvent. Preferred examples of high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

The amount of the wetting agent added is preferably 0.5 to 40% by weight, more preferably 2 to 20% by weight, based on the ink. The amount of the low-boiling organic solvent added is preferably 0.5 to 10% by weight, more preferably 1.5 to 6% by weight, based on the ink.

The ink composition used in the present invention may contain a dispersant and a surfactant. Examples of surfactants usable herein include various surfactants described above in connection with the resin emulsion.

According to a preferred embodiment of the present invention, the ink composition contains a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

If necessary, pH adjustors, preservatives, antimolds and the like may be added to the ink composition used in the present invention.

Reaction solution

The reaction solution used in the present invention contains a reactant that can break the state of dispersion and/or dissolution of the pigment, the resin emulsion and the like in the ink composition to cause coagulation of the pigment, the resin emulsion and the like. Examples of reactants usable herein include polyvalent metal salts, polyamines, and polyamine derivatives.

The polyvalent metal salt usable in the reaction solution is a salt that is constituted by divalent or higher polyvalent metal ions and anions bonded to the polyvalent metal ions and is soluble in water. Specific examples of polyvalent metal ions include divalent metal ions, such as $Ca^{2+}$, $Cu^{2+}$, $Ni^{2+}$, $Mg^{2+}$, $Zn^{2+}$, and $Ba^{2+}$, trivalent metal ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

Especially, a metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing good print quality and preventing clogging. It, however, is preferably about 0.1 to 40% by weight, more preferably about 5 to 25% by weight.

According to a preferred embodiment of the present invention, the polyvalent metal salt contained in the reaction solution is constituted by divalent or higher polyvalent metal ions and nitrate ions or carboxylate ions bonded to the polyvalent metal ions and is soluble in water.

In this case, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon group in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

Polyallylamine and polyallylamine derivative usable in the reaction solution are cationic polymers which are soluble in water and can be positively charged in water. Such polymers include, for example, those represented by the following formulae (I), (II), and (III):

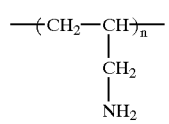
(I)

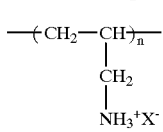
(II)

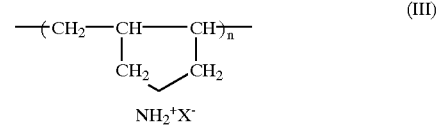
(III)

wherein $X^-$ represents chloride, bromide, iodide, nitrate, phosphate, sulfate, acetate or other ions.

In addition, a copolymer of an allylamine with a diallylamine and a copolymer of diallylmethylammonium chloride with sulfur dioxide may also be used.

The content of the polyallylamine and the polyallylamine derivative is preferably 0.5 to 10% by weight based on the reaction solution.

According to a preferred embodiment of the present invention, the reaction solution may further contain a polyol in addition to the polyvalent metal salt. The polyol has a vapor pressure of not more than 0.01 mmHg at 20° C., and the amount of the polyol added is such that weight ratio of the polyol to the polyvalent metal salt is not less than 1, preferably 1.0 to 5.0. Further, according to a preferred embodiment of the present invention, the amount of the polyol added is not less than 10% by weight, more preferably about 10 to 30% by weight, based on the reaction solution.

Specific examples of preferred polyols usable herein include polyhydric alcohols, for example, glycerin, diethylene glycol, triethylene glycol, 1,5-pentanediol, and 1,4-butanediol. Further specific examples of preferred polyols include saccharides, for example, monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose.

These polyols may be added alone or as a mixture of two or more. When the polyols are added as a mixture of two or more, the amount of these polyols added is such that the weight ratio of the total amount of the polyols to the polyvalent metal salt is not less than 1.

According to a preferred embodiment of the present invention, the reaction solution comprises a wetting agent comprising a high-boiling organic solvent. The high-boiling organic solvent functions to prevent the reaction solution from drying out, thereby preventing clogging of the head. Preferred examples of high-boiling organic solvents usable herein, some of which are described above in connection with the polyol, include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, and triethanolamine. According to a preferred embodiment of the present invention, the reaction solution may contain triethylene glycol monobutyl ether and glycerin in combination.

Although the amount of the. high-boiling organic solvent added is not particularly limited, it is preferably about 0.5 to 40% by weight, more preferably about 2 to 20% by weight.

According to a preferred embodiment of the present invention, the reaction solution may further contain a low-boiling organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time required for drying the ink composition. The amount of the low-boiling organic solvent added is preferably 0.5 to 10% by weight, more preferably 1.5 to 6% by weight.

According to a preferred embodiment of the present invention, the reaction solution may further contain a penetrant. Penetrants usable herein include various surfactants, such as anionic, cationic, and amphoteric surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

More preferred penetrants usable in the present invention are compounds represented by formula (IV) and/or lower alcohol ethers of polyhydric alcohols.

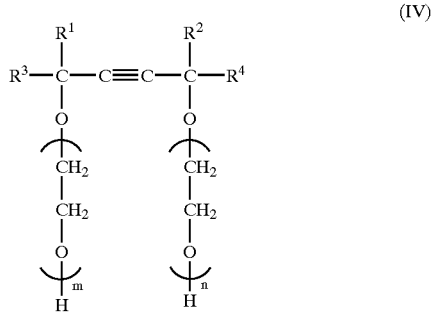

(IV)

wherein $0 \leq m+n \leq 50$ and $R^1$, $R^2$, $R^3$, and $R^4$ each independently represent an alkyl group.

Typical compounds represented by formula (IV) include OLFINE Y, Surfynol 82, Surfynol 440, Surfynol 465, and Surfynol 485 (all the above products being manufactured by Air Products and Chemicals Inc.). They may be added alone or in combination of two or more.

According to a preferred embodiment of the present invention, the reaction solution contains triethanolamine for pH adjustment purposes. The amount of the triethanolamine added is preferably about 0 to 2.0% by weight.

The colorant described above in connection with the ink composition may be added to the reaction solution so that the colored reaction solution functions also as an ink composition.

Ink jet recording apparatus

An ink jet recording apparatus for carrying out the ink jet recording method according to the present invention will be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, a recording medium 7 is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the suction pump 11 is resorvoired in a waste ink tank 13 through a tube 12.

Figure 2:
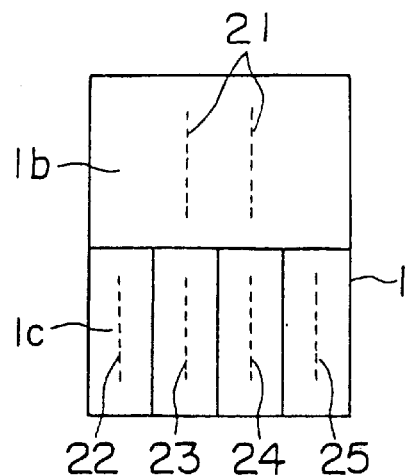
FIG. 2 is an enlarged view of A nozzle face in a recording head, wherein reference character 1b designates a nozzle face for a reaction solution and reference character 1c nozzle face for ink compositions.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
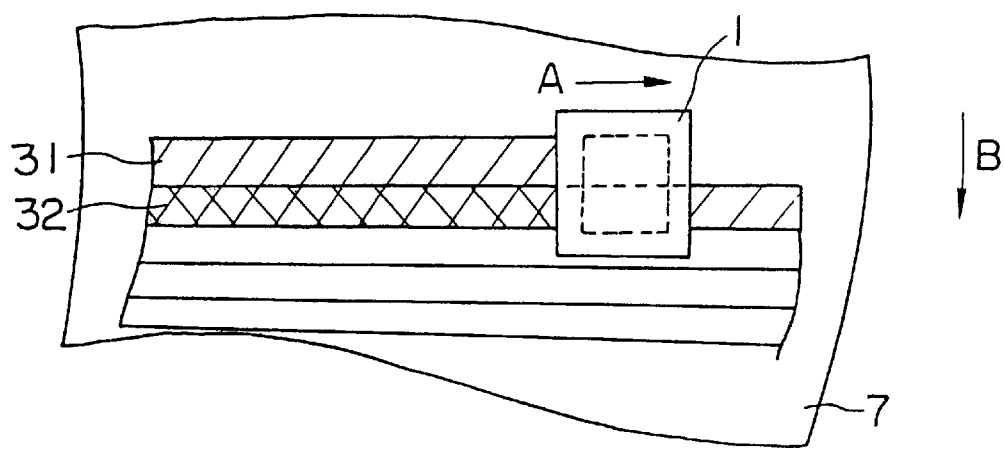
FIG. 3 is a diagram illustrating ink jet recording using the recording head shown, in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected through the nozzle surface 1b to form a reaction solution-deposited region 31 in a band form on the recording medium 7. Subsequently, the recording medium 7 is transferred by a predetermined extent in the recording medium feed direction indicated by an arrow B, during which time the recording head 1 is moved in the direction opposite to that indicated by the arrow A in the drawing and returned to the left end of the recording medium 7, and the recording head 1 conducts printing using the ink composition on the reaction solution-deposited region, thereby forming a print region 32.

Figure 4:
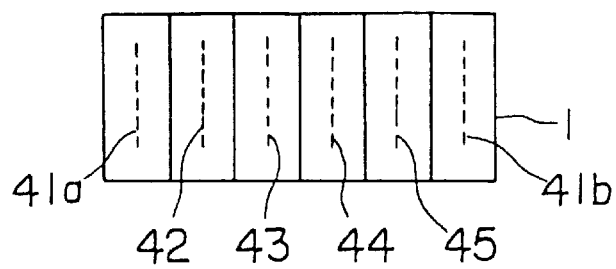
FIG. 4 is a diagram showing another embodiment of the recording head according to the present invention, wherein all ejection nozzles are arranged in the lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Regulating the surface tension of the reaction solution and the ink composition preferably by the above method enables a high-quality print to be more stably provided independently of the order of depositing the reaction solution and the ink composition. In this case, use of only one ejection nozzle for the reaction solution suffices for desired results (for example, the nozzle indicated by numeral 41b in the drawing may be omitted), leading to a further reduction in size of head and an increase in printing speed.

In the ink jet recording apparatus, the supplement of the ink composition may be carried out by replacing a cartridge as an ink tank. The ink tank may be integral with the recording head.

Figure 5:
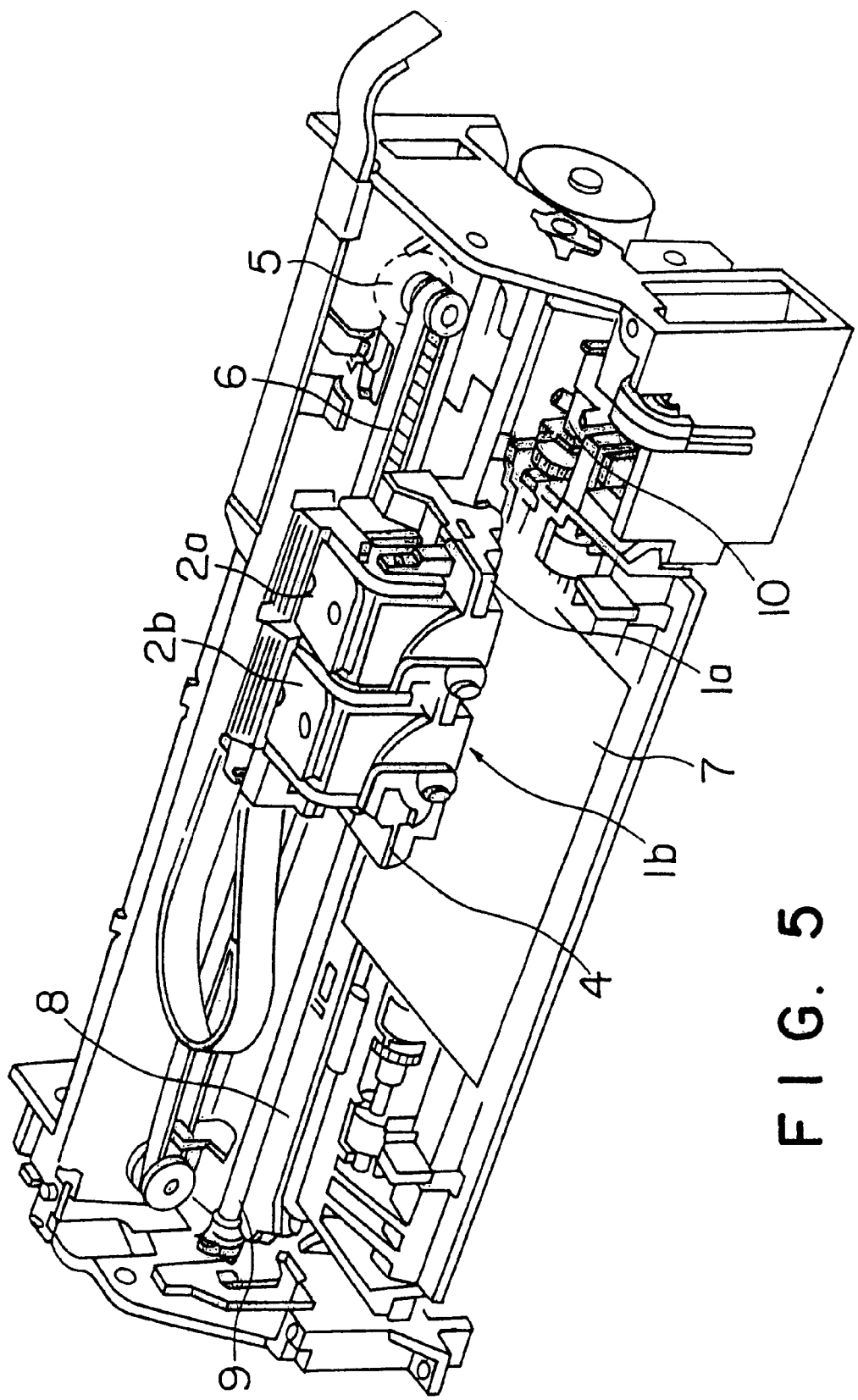
FIG. 5 is a diagram showing an ink jet recording apparatus according to the present invention, wherein a recording head is integral with an ink tank.

A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1b is moved together with the ink tank 2b on the carriage 4.

Figure 6:
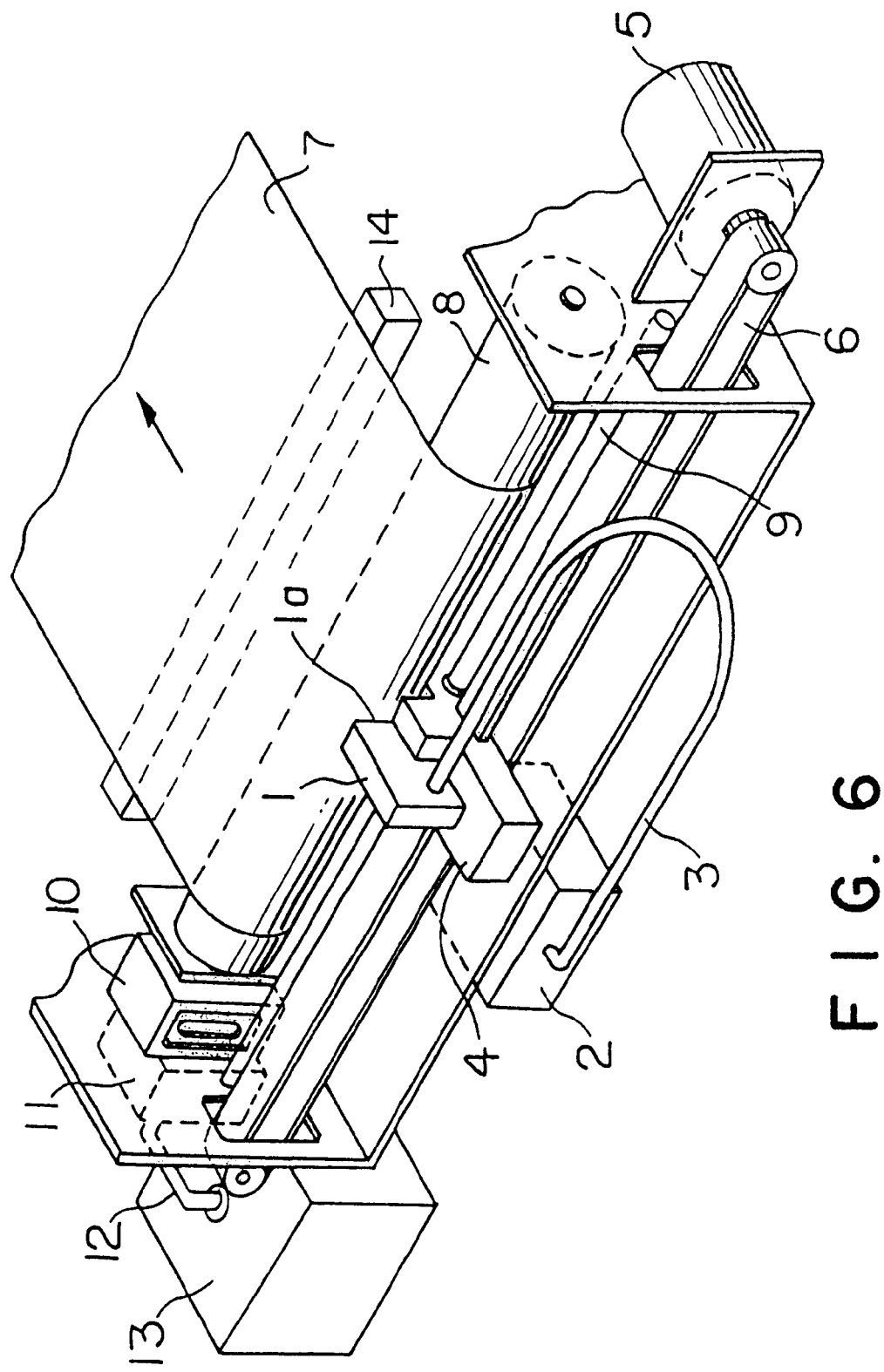
FIG. 6 is a diagram showing an ink jet recording apparatus according to the present invention, wherein a heater is provided to heat a recording medium after printing.

A preferred embodiment of an ink jet recording apparatus wherein a heater for heating a printed recording medium is provided is shown in FIG. 6. The embodiment shown in FIG. 6 is the same as the embodiment shown in FIG. 1, except that a heater 14 is additionally provided. The heater 14 may be of a contact type wherein, in heating the recording medium, it is brought into contact with the recording medium. Alternatively, the heater 14 may be of a non-contact type where the recording medium is heated by applying infrared rays or the like or blowing hot air to the recording medium.

EXAMPLES

Preparation of Ink Composition A

| Black ink A1 | |
|---|---|
| Carbon Black MA 7 (manufactured by Mitsubishi Chemical Corporation) | 5 wt % |
| Styrene/acrylic acid copolymer (dispersant) | 1 wt % |
| Voncoat 4001 (acrylic resin emulsion, resin component 50%, MFT = 5° C., manufactured by Dainippon Ink and Chemicals, Inc.) | 10 wt % |
| Glycerin | 10 wt % |
| Ion-exchanged water | Balance |

The ink was prepared as follows. The carbon black, the dispersant, and a part of water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a dispersion of carbon black. Separately, all the above ingredients except for the carbon black, the dispersant and the part of water used in the preparation of the carbon black dispersion were mixed together to prepare an ink solvent. The ink solvent was gradually added dropwise to the carbon black dispersion while stirring the dispersion. The mixture was stirred at room temperature for 20 min. The mixture was filtered through a 5-$\mu$m membrane filter to prepare an ink for ink jet recording.

The following ink compositions were prepared in the same manner as used in the preparation of the black ink 1.

| Black ink A2 | |
|---|---|
| Carbon Black MA 100 (manufactured by Mitsubishi Chemical Corporation) | 1 wt % |
| Styrene/acrylic acid copolymer (dispersant) | 1 wt % |
| Voncoat 5454 (styrene/acrylic resin emulsion, resin component 45%, MFT = 4° C., manufactured by Dainippon Ink and Chemicals, Inc.) | 44.4 wt % |
| Glycerin | 10 wt % |
| Ion-exchanged water | Balance |
| Black ink A3 | |
| C.I. Pigment Black 1 | 5 wt % |
| Styrene/acrylic acid copolymer (dispersant) | 1 wt % |
| Microgel E-5002 (styrene/acrylic resin emulsion, resin component 29.2%, MFT = 80° C., manufactured by Nippon Paint Co., Ltd.) | 15 wt % |
| Diethylene glycol | 10 wt % |
| Ion-exchanged water | Balance |
| Color ink set A1 | |
| Cyan ink A1 | |
| C.I. Pigment Blue 15:3 | 2 wt % |
| Styrene/acrylic acid copolymer (dispersant) | 1 wt % |
| Voncoat 4001 (acrylic resin emulsion, resin component 50%, MFT = 5° C., manufactured by Dainippon Ink and Chemicals, Inc.) | 10 wt % |
| Diethylene glycol | 10 wt % |
| Ion-exchanged water | Balance |
| Magenta ink A1 | |
| C.I. Pigment Red 122 | 3 wt % |
| Styrene/acrylic acid copolymer (dispersant) | 1 wt % |
| Voncoat 5454 (styrene/acrylic resin emulsion, resin component 45%, MFT = 4° C., manufactured by Dainippon Ink and Chemicals, Inc.) | 20 wt % |
| Glycerin | 8 wt % |
| Ion-exchanged water | Balance |
| Yellow ink A1 | |
| C.I. Pigment Yellow 74 | 3.5 wt % |
| Styrene/acrylic acid copolymer (dispersant) | 1 wt % |
| Voncoat 4001 (acrylic resin emulsion, resin component 50%, MFT = 5° C., manufactured by Dainippon Ink and Chemicals, Inc.) | 15 wt % |
| Glycerin | 8 wt % |
| Ion-exchanged water | Balance |
| Color ink set A2 | |
| Cyan ink A2 | |
| Pigment: KET BLUE EX-1 (manufactured by Dainippon Ink and Chemicals, Inc.) | 3 wt % |
| Styrene/acrylic acid copolymer (dispersant) | 1 wt % |
| Microgel E-5002 (styrene/acrylic resin emulsion, resin component 29.2%, MFT = 80° C., manufactured by Nippon Paint Co., Ltd.) | 7 wt % |
| Glycerin | 10 wt % |
| Ion-exchanged water | Balance |
| Magenta ink A2 | |
| Pigment: KET RED 309 (manufactured by Dainippon Ink and Chemicals, Inc.) | 4 wt % |
| Styrene/acrylic acid copolymer (dispersant) | 1 wt % |
| SAE 1014 (styrene/acrylic resin emulsion, resin component 40%, MFT = 70 to 90° C., manufactured by Nippon Zeon Co., Ltd.) | 9 wt % |
| Diethylene glycol | 15 wt % |
| Ion-exchanged water | Balance |
| Yellow ink A2 | |
| Pigment: KET Yellow 403 | 3 wt % |
| Styrene/acrylic acid copolymer (dispersant) | 1 wt % |
| Microgel E-5002 (styrene/acrylic resin emulsion, resin component 29.2%, MFT = 80° C., manufactured by Nippon Paint Co., Ltd.) | 10 wt % |
| Ethylene glycol | 10 wt % |
| Ion-exchanged water | Balance |

Preparation of reaction solution A

| Reaction solution A1 | |
|---|---|
| Magnesium nitrate hexahydrate | 25 wt % |
| Triethylene glycol monobutyl ether | 10 wt % |
| Glycerin | 10 wt % |
| Ion-exchanged water | Balance |

The above ingredients were mixed together to prepare a reaction solution A1.

| Reaction solution A2 | |
|---|---|
| Polyallylamine PAA-HCL-3L (resin component 50%, manufactured by Nitto Boseki Co., Ltd.) | 20 wt % |
| Diethylene glycol | 15 wt % |
| Ion-exchanged water | Balance |

The above ingredients were mixed together to prepare a reaction solution A2.

Print evaluation test A

The above ink compositions and reaction solutions were used in combinations as shown in Table 1, and were actually printed by means of an ink jet printer. The prints were then evaluated for print quality and the like.

TABLE 1

|  | Reaction solution A | Black ink A | Color ink set A |
|---|---|---|---|
| Ex.1 | 1 | 1 | 1 |
| Ex.2 | 2 | 2 | 1 |
| Comp.Ex.1 | 2 | 3 | 2 |

Printing on non-absorbing recording medium

Printing was carried out using the inks 1 to 3, the color ink sets 1 and 2, and the reaction solution 1 by means of an ink jet printer MJ-930C (manufactured by Seiko Epson Corp.) on a PET film.

Evaluation A1: Color bleeding

The reaction solution, the black ink, and the color ink were simultaneously printed at 100% duty on a PET film, and the prints were visually inspected for uneven color mixing in boundaries of different colors. The results were evaluated according to the following criteria.

A: No color mixing occurred, and the boundaries between adjacent colors were clear.
B: Slight color mixing occurred.
C: Feather-like color mixing occurred.
D: Significant color mixing occurred to such an extent that the boundaries between adjacent colors blurred.

Evaluation A2: Fixation of ink

The reaction solution, the black ink, and the color ink were simultaneously printed at 100% duty on a PET film. The records thus obtained were allowed to stand at room temperature for one day. Thereafter, the printed face was strongly rubbed with a finger. The results were evaluated according to the following criteria.

A: The ink was not separated at all.
B: The ink was slightly separated.
C: The ink was completely separated.

Evaluation A3: Fixation of ink by heating The reaction solution, the black ink, and the color ink were simultaneously printed at 100% duty on a PET film. Immediately after the printing, the recording medium was heated from the backside by means of a heater at 50° C. for 5 sec. Immediately after the heating, the printed face of the recording medium was strongly rubbed with a finger. The results were evaluated according to the following criteria.

A: The ink was not separated at all.
B: The ink was slightly separated.
C: The ink was completely separated.

The results of the evaluation were as summarized in Table 2 below.

TABLE 2

|  | Evaluation A1 | Evaluation A2 | Evaluation A3 |
|---|---|---|---|
| Ex.1 | A | A | A |
| Ex.2 | A | A | A |
| Comp.Ex.1 | A | C | C |

Preparation of aqueous resin emulsion B

A reactor equipped with a stirrer, a reflux condenser, a dropping device, and a thermometer was charged with 370 g of pure water and 1 g of sodium dodecylbenzenesulfonate. 2.3 g of potassium persulfate was added to the system at a temperature of 70° C. in a nitrogen atmosphere with stirring.

On the other hand, three-phase emulsion monomers having the following compositions were separately provided. Specifically, a mixture of 36.0 g of pure water, 0.2 g of sodium dodecylbenzenesulfonate, 38.6 g of styrene, 32.9 g of butyl acrylate, 22.5 g of glycidyl methacrylate, and 0.1 g of t-dodecylmercaptan was provided as the first phase. A mixture of 72.0 g of pure water, 0.4 g of sodium dodecylbenzenesulfonate, 93.2 g of styrene, 88.8 g of butyl acrylate, and 0.2 g of t-dodecylmercaptan was provided as the second phase. A mixture of 72.0 g of pure water, 0.4 g of sodium dodecylbenzenesulfonate, 57.6 g of styrene, 110.9 g of butyl acrylate, 30 g of methacrylic acid, and 0.2 g of t-dodecylmercapatan was provided as the third phase. The first emulsion monomer was added dropwise to the above aqueous solution, followed by digestion. Further, for the second phase and the third phase, the dropwise addition of the emulsion monomer and the digestion were repeated.

The dropping time was 3 hr for the first phase, 2 hr for the second and third phases, and, for each phase, the digestion time was 2 hr.

The aqueous resin emulsion thus obtained was cooled to room temperature, and ion-exchanged water and aqueous ammonia were then added thereto to adjust the aqueous resin emulsion to solid content 35% by weight and pH 8.

The aqueous resin emulsion thus obtained had a minimum film-forming temperature of about 18° C., a surface tension of $57 \times 10^{-3}$ N/m, a contact angle of 89 degrees, a particle diameter of 0.09 μm, and a half value period in a reaction with $Mg^{2+}$ ions of 10 sec.

Preparation of ink composition B

Ink compositions were prepared according to the following formulations. Specifically, the ink was prepared as follows.

The pigment, the dispersant, and a part of water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a pigment dispersion. Separately, all the above ingredients except for the carbon black, the dispersant and the part of water used in the preparation of the pigment dispersion were mixed together to prepare an ink solvent. The ink solvent was gradually added dropwise to the pigment dispersion while stirring the pigment dispersion. The mixture was stirred at room temperature for 20 min. The mixture was filtered through a 5-μm membrane filter to prepare an ink composition for ink jet recording.

| Ink composition B1 | |
|---|---|
| Carbon Black MA 7 (manufactured by Mitsubishi Chemical Corporation) | 5 wt % |
| Styrene/acrylic acid copolymer (dispersant) | 1 wt % |
| Aqueous resin emulsion B prepared above (in terms of concentration of fine particles of polymer) | 10 wt % |
| Glycerin | 10 wt % |
| Ion-exchanged water | Balance |
| Ink composition B2 | |
| C.I. Pigment Black 1 | 1 wt % |
| Styrene/acrylic acid copolymer (dispersant) | 1 wt % |
| Glycerin | 15 wt % |
| Ion-exchanged water | Balance |

-continued

Color ink set B1
Cyan ink B1

| | |
|---|---|
| C.I. Pigment Cyan 15:3 | 2 wt % |
| Styrene/acrylic acid copolymer (dispersant) | 1 wt % |
| Aqueous resin emulsion B prepared above (in terms of concentration of fine particles of polymer) | 10 wt % |
| Ion-exchanged water | Balance |

Magenta ink B1

| | |
|---|---|
| C.I. Pigment Red 122 | 3 wt % |
| Styrene/acrylic acid copolymer (dispersant) | 1 wt % |
| Aqueous resin emulsion B prepared above (in terms of concentration of fine particles of polymer) | 20 wt % |
| Glycerin | 5 wt % |
| Diethylene glycol | 5 wt % |
| Ion-exchanged water | Balance |

Yellow ink B1

| | |
|---|---|
| C.I. Pigment Yellow 74 | 3.5 wt % |
| Styrene/acrylic acid copolymer (dispersant) | 1 wt % |
| Aqueous resin emulsion B prepared above (in terms of concentration of fine particles of polymer) | 15 wt % |
| Glycerin | 8 wt % |
| Ion-exchanged water | Balance |

Color ink set B2
Cyan ink B2

| | |
|---|---|
| Pigment: KET BLUE EX-1 (manufactured by Dainippon Ink and Chemicals, Inc.) | 3 wt % |
| Styrene/acrylic acid copolymer (dispersant) | 1 wt % |
| Glycerin | 10 wt % |
| Ion-exchanged water | Balance |

Magenta ink B2

| | |
|---|---|
| Pigment: KET Red 309 (manufactured by Dainippon Ink and Chemicals, Inc.) | 4 wt % |
| Styrene/acrylic acid copolymer (dispersant) | 1 wt % |
| Diethylene glycol | 15 wt % |
| Ion-exchanged water | Balance |

Yellow ink B2

| | |
|---|---|
| Pigment: KET Yellow 403 (manufactured by Dainippon Ink and Chemicals, Inc.) | 3 wt % |
| Styrene/acrylic acid copolymer (dispersant) | 1 wt % |
| Ion-exchanged water | Balance |

Preparation of reaction solution B
Reaction solution B1

| | |
|---|---|
| Magnesium nitrate hexahydrate | 25 wt % |
| Triethylene glycol monobutyl ether | 10 wt % |
| Glycerin | 10 wt % |
| Ion-exchanged water | Balance |

Reaction solution B2

| | |
|---|---|
| Polyallylamine PAA-HCL-3L (resin component 50%, manufactured by Nitto Boseki Co., Ltd.) | 20 wt % |
| Diethylene glycol | 15 wt % |
| Ion-exchanged water | Balance |

Print evaluation test B

The reaction solutions B, the ink compositions B, and the color ink sets B were used in combination as indicated in Table 3 to perform printing on a PET film by means of an ink jet printer MJ-930C manufactured by Seiko Epson Corp. The unit "duty" used herein refers to a unit of a value D defined and calculated by equation (I):

$$D = \frac{\text{number of actually printed dots}}{\text{longitudinal resolution} \times \text{transverse resolution}} \times 100 \text{ (duty)} \quad (I)$$

TABLE 3

| | Reaction solution B | Ink composition B | Color ink set B |
|---|---|---|---|
| Ex.1 | 1 | 1 | 1 |
| Ex.2 | 2 | 1 | 1 |
| Ex.3 | 1 | 2 | 2 |
| Ex.4 | 2 | 2 | 2 |

Evaluation B1: Color bleeding

The reaction solution, the black ink, and the color ink were simultaneously printed at 100% duty on a PET film, and the prints were visually inspected for uneven color mixing in boundaries of different colors. The results were evaluated according to the following criteria.

A: No color mixing occurred, and the boundaries between adjacent colors were clear.

B: Slight color mixing occurred.

C: Feather-like color mixing occurred.

D: Significant color mixing occurred to such an extent that the boundaries between adjacent colors blurred.

Evaluation B2: Fixation of ink

The reaction solution, the black ink, and the color ink were simultaneously printed at 100% duty on a PET film. The records thus obtained were allowed to stand at room temperature for one day. Thereafter, the printed face was strongly rubbed with a finger to evaluate the fixation of ink.

A: The ink was not separated at all.

B: The ink was slightly separated.

C: The ink was completely separated.

Evaluation B3: Fixation of ink by heating

The reaction solution, the black ink, and the color ink were simultaneously printed at 100% duty on a PET film. Immediately after the printing, the recording medium was heated from the backside by means of a heater at 50° C. for 5 sec. Immediately after the heating, the printed face of the recording medium was strongly rubbed with a finger to evaluate the fixation of ink.

A: The ink was not separated at all.

B: The ink was slightly separated.

C: The ink was completely separated.

The results of the evaluation test B were as summarized in Table 4 below.

TABLE 4

| | Evaluation B1 | Evaluation B2 | Evaluation B3 |
|---|---|---|---|
| Ex.1 | A | A | A |
| Ex.2 | A | A | A |
| Ex.3 | D | C | C |
| Ex.4 | D | C | C |

What is claimed is:

1. An ink jet recording method comprising the steps of: depositing a reaction solution and an ink composition onto a recording medium to perform printing,
   wherein the recording medium does not substantially absorb the ink composition;
   the reaction solution comprises a reactant which, when brought into contact with the ink composition, produces coagulate; and
   the ink composition comprises a pigment and resin emulsion having a minimum film-forming temperature of 20° C. or below, the content of a polymer particulate in the ink composition being not less than 5% by weight, and the weight ratio of the polymer particulate to the pigment is in the range of 1 to 20.

2. The ink jet recording method according to claim 1, wherein the polymer particulates have a diameter of not more than 100 nm.

3. The ink jet recording method according to claim 2, wherein the resin emulsion has a film-forming property, have carboxyl groups on the surface of polymer particulates, and have a reactivity with a divalent metal salt such that, when 3 volumes of a 0.1 wt % aqueous emulsion is brought into contact with one volume of a 1 mol/liter aqueous divalent metal salt solution, the time required for the transmission of light having a wavelength of 700 nm to become 50% of the initial value is not more than $1 \times 10^4$ sec.

4. The ink jet recording method according to claim 1, wherein an aqueous emulsion prepared by dispersing the polymer particulates in a water medium and adjusting the polymer particulate concentration to 10% by weight has a contact angle on a teflon sheet of not less than 70 degrees.

5. The ink jet recording method according to claim 1, wherein an aqueous emulsion prepared by dispersing the polymer particulates in a water medium and adjusting the polymer particulate concentration to 35% by weight has a surface tension of not less than $40 \times 10^{-3}$ N/m (20° C.).

6. The ink jet recording method according to claim 1, wherein the polymer particulates contain 1 to 10% by weight of a structure derived from an unsaturated vinyl monomer having a carboxyl group and has a structure crosslinked by a crosslinkable monomer having two or more polymerizable double bonds with the content of the structure derived from the crosslinkable monomer being 0.2 to 4% by weight.

7. The ink jet recording method according to claim 1, wherein the polymer particulates have a core/shell structure.

8. The ink jet recording method according to claim 7, wherein the polymer particulates are self-crosslinkable.

9. The ink jet recording method according to claim 8, wherein the polymer particulates comprise the core comprising an epoxy-containing resin and the shell comprising carboxyl-containing resin.

10. The ink jet recording method according to claim 1, which further contains an organic solvent.

11. The ink jet recording method according to claim 1, wherein the surface of the recording medium is formed of a plastic or a metal.

12. The ink jet recording method according to claim 1, wherein the reactant is a polyvalent metal salt, a polyallylamine, or a derivative of the polyallylamine.

13. The ink jet recording method according to claim 12, wherein the polyvalent metal salt is a nitrate or a carboxylate.

14. The ink jet recording method according to claim 13, wherein carboxylate acid ions constituting the carboxylate have been derived from a saturated aliphatic carboxylic acid having 1–6 carbon atoms and wherein the hydrogen atoms on the saturated hydrocarbon group in the monocarboxylic acid are optionally substituted by a hydroxyl group or a carbocyclic monocarboxylic acid having 6 to 10 carbon atoms.

15. The ink jet recording method according to claim 1, wherein the reaction solution further contains triethylene glycol monobutyl ether and glycerin.

16. The ink jet recording method according to claim 1, wherein the step of ejecting the droplets of the ink composition on the recording medium is carried out after the step of depositing the reaction solution onto the recording medium.

17. The ink jet recording method according to claim 1, wherein the step of ejecting the droplets of the ink composition on the recording medium is carried out before the step of depositing the reaction solution onto the recording medium.

18. A record produced by the method according to claim 1.

19. The ink jet recording method according to claim 1, wherein the recording medium comprises a surface material selected from the group consisting of a plastic, a coated metal, a paper treated to impart water repellency to the paper, a cloth treated to impart water repellency to the cloth and a ceramic prepared by firing an inorganic material at a high temperature.

* * * * *